(12) United States Patent
Douguet et al.

(10) Patent No.: US 8,280,041 B2
(45) Date of Patent: Oct. 2, 2012

(54) CHINESE REMAINDER THEOREM-BASED COMPUTATION METHOD FOR CRYPTOSYSTEMS

(75) Inventors: Michel Douguet, Marseilles (FR); Neil M. McKeeney, Soisy-sous-Montmorency (FR)

(73) Assignee: Inside Secure, Aix-en-Provence (FR)

( * ) Notice: Subject to any disclaimer, the term of this patent is extended or adjusted under 35 U.S.C. 154(b) by 657 days.

(21) Appl. No.: 11/684,842

(22) Filed: Mar. 12, 2007

(65) Prior Publication Data

US 2008/0226064 A1 Sep. 18, 2008

(51) Int. Cl.
H04K 1/00 (2006.01)
(52) U.S. Cl. ............. 380/30; 380/28; 380/44; 380/277; 708/492; 708/491
(58) Field of Classification Search .............. 380/30, 380/28, 44, 277
See application file for complete search history.

(56) References Cited

U.S. PATENT DOCUMENTS

| | | | |
|---|---|---|---|
| 4,964,164 A | 10/1990 | Fiat | |
| 5,289,397 A | 2/1994 | Clark et al. | |
| 5,663,896 A | 9/1997 | Aucsmith | |
| 5,991,415 A | 11/1999 | Shamir | |
| 6,144,740 A | 11/2000 | Laih et al. | |
| 6,298,442 B1 | 10/2001 | Kocher et al. | |
| 6,304,658 B1 | 10/2001 | Kocher et al. | |
| 6,381,699 B2 | 4/2002 | Kocher et al. | |
| 6,594,761 B1 | 7/2003 | Chow et al. | |
| 2002/0064278 A1 | 5/2002 | Lim et al. | |
| 2002/0194237 A1 | 12/2002 | Takahashi et al. | |
| 2003/0028771 A1 | 2/2003 | Kocher et al. | |
| 2003/0044014 A1 | 3/2003 | Liardet et al. | |
| 2003/0065696 A1 | 4/2003 | Ruehle et al. | |
| 2004/0059767 A1 | 3/2004 | Liardet | |
| 2004/0098435 A1 * | 5/2004 | Moore | 708/491 |
| 2004/0184604 A1 | 9/2004 | Joye et al. | |
| 2004/0215685 A1 * | 10/2004 | Seifert et al. | 708/492 |
| 2005/0063548 A1 | 3/2005 | Antipa | |
| 2006/0023873 A1 | 2/2006 | Joye | |
| 2008/0104402 A1 * | 5/2008 | Gueron et al. | 713/176 |
| 2009/0122980 A1 * | 5/2009 | Ciet et al. | 380/30 |

FOREIGN PATENT DOCUMENTS

WO WO-2008/112273 A1 9/2008

OTHER PUBLICATIONS

Coutinho, S.C.(1999). The mathematics of ciphers number theory and RSA cryptography. pp. 110-118.*

(Continued)

*Primary Examiner* — Ashok Patel
*Assistant Examiner* — Brian Shaw
(74) *Attorney, Agent, or Firm* — Schwegman Lundberg & Woessner, P.A.

(57) ABSTRACT

A computer hardware implemented cryptography method computes a modular exponentiation, $M := C^d \pmod{p \cdot q}$, upon a message data value C using a Chinese Remainder Theorem (CRT) based technique. To secure against cryptanalysis, the private key moduli p and q are transformed by multiplication with a generated random value s, so that $p' := p \cdot s$ and $q' := q \cdot s$, as shown in an exemplary embodiment in FIG. 2. The CRT steps of the modular exponentiation are applied using the transformed moduli p' and q' to obtain a random intermediate message data value M'. A final reduction of M' modulo $p \cdot q$ yields the final message data value M. Values needed for the computation are loaded into data storage and accessed as needed by electronic processing hardware.

15 Claims, 2 Drawing Sheets

OTHER PUBLICATIONS

Rutgers. Modular Arithmetic. Retrieved from http://ww.math.rutgers.edu/~erowland/modulararithmetic.html.*

Rutgers (no date). Modular Arithmetic. Retrieved from http://ww.math.rutgers.edu/~erowland/modulararithmetic.html(No Date).*

Cryptography Standard: PKCS #1 v2.1, RSA Laboratories, Jun. 14, 2002, 61 pages.

"International Application Serial No. PCT/US08/03324, International Search Report mailed Jun. 30, 2008", 4 pgs.

"International Application Serial No. PCT/US08/03324, Written Opinion mailed Jun. 30, 2008", 7 pgs.

Davis, D., "Re: Montgomery Multiplication", [retrieved on Sep. 21, 2010]. Retrieved from the Internet: <URL: http://www.mail-archive.com/cryptography@wasabisystems.com/msg02273.html>, (Jul. 2, 2002), 2 pgs.

Menezes, A., et al., "The Handbook of Applied Cryptography", www.cacr.math.uaterloo.ca/hac, (1996), 45 pages.

* cited by examiner

Fig._1

CHINESE REMAINDER THEOREM-BASED COMPUTATION METHOD FOR CRYPTOSYSTEMS

TECHNICAL FIELD

The present invention relates to cryptographic methods carried out in electronic processing hardware with associated software. In particular, the invention relates to cryptographic computations performed by such electronic processing hardware that involve finite field, residue or congruence operations, and especially modular exponentiation calculations employing Chinese Remainder Theorem based techniques, with attention to variations for thwarting cryptanalysis.

BACKGROUND ART

Many cryptographic algorithms are based on modular exponentiation calculations of the type $m \equiv c^d \pmod n$, where c and m can correspond to data of various kinds (plaintext and ciphertext messages, signatures, message digests, authentication codes, etc.) and where d and n cat correspond to elements of public or private keys for operating upon that data. The modulus n is usually the product of two very large primes p and q that are kept secret. The RSA algorithm is one example of an encryption system (and related digital signature scheme) that uses modular exponentiation. The Diffie-Hellman key agreement protocol is another.

In the RSA algorithm, a public key $\{e, n\}$ and a corresponding private key $\{d, p, q\}$ are provided for encryption and decryption, where $d \cdot e \equiv 1 \pmod{\phi(n)}$, $n = p \cdot q$, $\phi(n) = (p-1)(q-1)$, and where integer e and $\phi(n)$ are co-prime. Alternatively, a function $\lambda(n) = LCM(p-1, q-1)$ is often used in place of the original $\phi(n)$. (RSA PKCS#1 v.2.1) For encryption a ciphertext c may be obtained from a plaintext message m using the public key $\{e, n\}$ according to the relation $c \equiv m^e \pmod n$. The public key exponent e is usually a small value (e.g., 3, 5, 35, or $2^{16}+1=65537$) chosen for ease and speed of encryption. For decryption, the plaintext message m may be recovered from the ciphertext c using the private key $\{d, p, q\}$ according to the relation $m \equiv c^d \pmod{(p \cdot q)}$.

The Chinese Remainder Theorem (CRT) is often used to speed the modular exponentiation calculations involved in the decryption, since the otherwise secret prime factors p and q are known to the user. That theorem generally states that given a set of simultaneous congruences $x \equiv a_i \pmod{n_i}$, for $i=1$ to r, and for which the moduli $n_i$ are pairwise relatively prime, the solution is $x \equiv [\Sigma_i a_i \cdot b_i (N/n_i)] \pmod N$, where $N = n_1 \cdot n_2 \cdots n_r$, and the $b_i$ are determined from $b_i (N/n_i) \equiv 1 \pmod{n_i}$. For two relatively prime positive integers p and q and two integers a and b (i.e., the case r=2), there exists an integer m uniquely determined modulo $p \cdot q$, such that $m \equiv a \pmod p \equiv b \pmod q$. That is, for GCD $(p, q)=1$, every pair of residue classes modulo p and q corresponds to a simple residue class modulo $p \cdot q$. The solution finds $m \equiv [a \cdot (q^{-1} \bmod p) \cdot q + b \cdot (p^{-1} \bmod q) \cdot p] \pmod{p \cdot q}$. A modular inverse of an integer $x^{-1}$ modulo z is defined such that $x \cdot x^{-1} \equiv 1 \pmod z$. For a prime modulus, every nonzero integer not a multiple of the modulus has an inverse.)

CRT implementation of the RSA algorithm calculates the modular exponentiation $m := c^d \pmod{(p \cdot q)}$ as follows. First define a pair of private key derived exponents as $d_1 := d \pmod{(p-1)}$ and $d_2 := d \pmod{(q-1)}$. Then, calculate $m_1 := c^{d_1} \pmod p$ and $m_2 := c^{d_2} \pmod q$.
Finally, $m = CRT(m_1, m_2) := m_1 + p \cdot \{[(m_2 - m_1) \cdot R] \pmod q\}$, where $R \equiv p^{-1} \pmod q$.

That last formula of the CRT implementation, namely $m = CRT(m_1, m_2)$, has many variants. Three examples of these variants are:
$CRT_2 (m_1, m_2) := (m_1 \cdot R_1 \cdot q + m_2 \cdot R_2 \cdot p) \pmod{p \cdot q}$, where $R_1 \equiv q^{-1} \pmod p$ and $R_2 \equiv p^{-1} \pmod q$;
$CRT_3(m_1, m_2) := \{[(m_1 \cdot R_1)(\bmod p)] \cdot q + [(m_2 \cdot R_2) (\bmod q)] \cdot p\} \pmod{p \cdot q}$, where again $R_1 \equiv q^{-1} \pmod p$ and $R_2 \equiv p^{-1} \pmod q$; and
$CRT_4 (m_1, m_2) := (q \cdot \{[(m_1 - m_2) \cdot R_4] \pmod p\} + m_2) \pmod{p \cdot q}$, where $R_4 \equiv p^{-1} \pmod q$.

Variant CRT implementations perform the modular exponentiation calculation in ways designed to thwart cryptanalysis, especially in the context of tokens (e.g., smart cards) where an attacker has access to the hardware carrying out the cryptographic computations. An attacker may employ noninvasive measurement and timing analysis of electromagnetic emissions, power consumption, or other accessible parameters of a device during computational processes in order to extract useful information regarding the private keys. The variant implementations typically employ pseudo-random variables at various stages of the cryptographic algorithm in order to mask the underlying mathematical operations without affecting the final result.

For example, in CRT implementations of modular exponentiation, some variants transform the message variable m or its CRT components, $m_1$ and $m_2$, by multiplying with a random value at some early stage in the computational process then at a later stage divide the message variable by that same random value or by a related value derived from it to obtain the true result. Other variants may transform the private key exponent d or its CRT components, $d_1$ and $d_2$, by adding a random multiple of (p-1) or (q-1) to obtain another (random) member of the congruence class for that private key component. The private key exponent d could likewise be reduced to transformed CRT components, $d_1'$ and $d_2'$, using moduli that are corresponding random multiples of (p-1) and (q-1), respectively. In all these cases, the design of the transformations are chosen to obtain a true final result, while randomly varying the intermediate calculations in a manner that take advantage of equivalences in congruence arithmetic. Unfortunately, many of these variants can be quite complex and computationally intense.

SUMMARY DISCLOSURE

The present invention is a computer hardware-implemented cryptography method using Chinese Remainder Theorem (CRT) implemented modular operations, in which a modulus for the computations is transformed in order to blind cryptanalytic observations of intermediate results. In particular, for a modular exponentiation operation, $m = c^d \pmod{p \cdot q}$, a transformation factor s is used to transform the co-prime factors p and q into $p' = s \cdot p$ and $q' = s \cdot q$. The CRT steps are applied using the transformed moduli p' and q'. After obtaining an intermediate result m', the final result m is recovered by a final reduction modulo $p \cdot q$. The transformation factor s may be a random value, a random choice from a finite set of preselected fixed values, or, if security is not an issue in a given circumstance, could even be a fixed value. The method is relatively simple and less computational intense than many other variants, yet is still substantially secure against cryptanalysis. Hence, it is suitable for use in smart cards and other cryptographic token applications. It can be employed with any cryptographic algorithm that relies on modular exponentiation with CRT implementations.

The method may he implemented as a cryptography program in data processing hardware, such as smart card or other token, that comprises a cryptographic processor unit, data storage accessible to that processor unit, and pseudo-random number generating circuitry providing the random factor.

DETAILED DESCRIPTION

Figure 1:
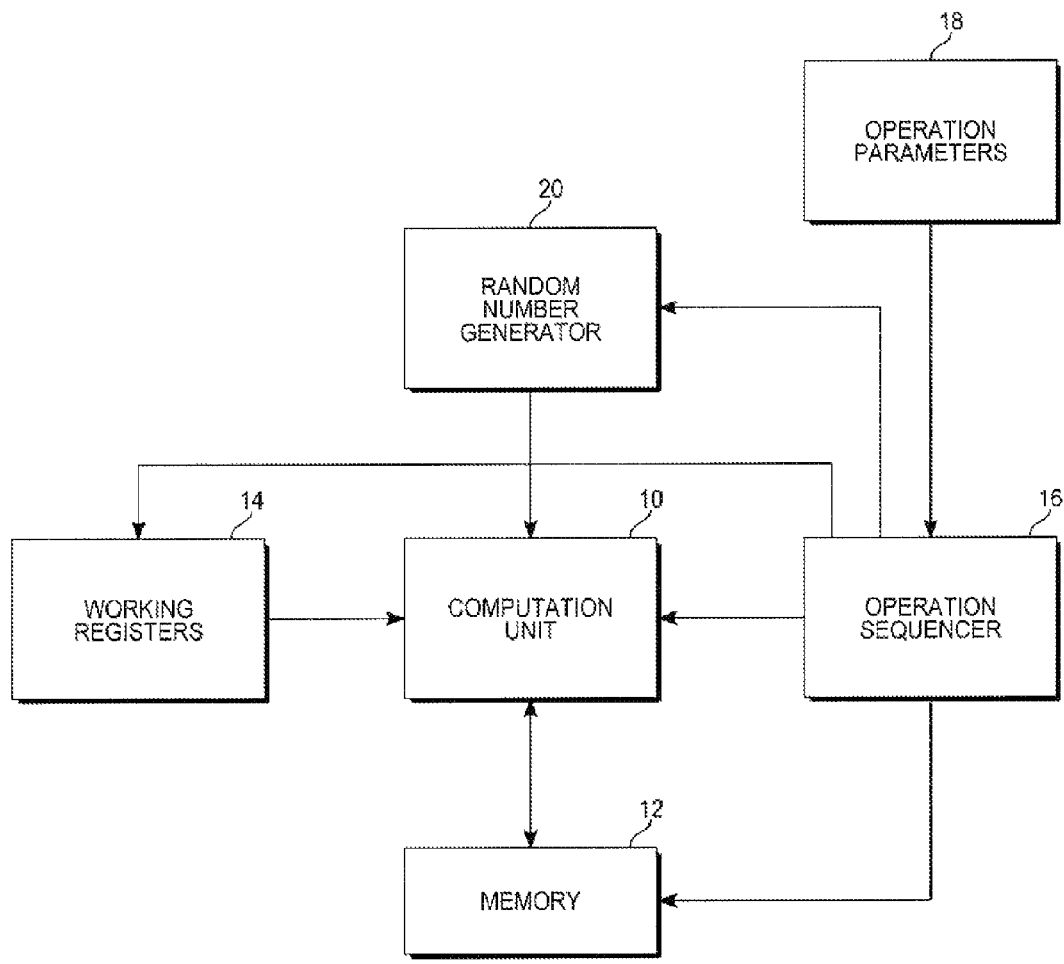
FIG. 1 is a schematic plan view of exemplary processor hardware for use in executing a cryptography method in accord with the present invention, including CRT-based modular exponentiation.

With reference to FIG. 1, the cryptographic method of the invention may be implemented in a wide variety of digital processing systems, logic circuitry or electronic hardware, or by executing an equivalent firmware or software program in a data processor or computer. Exemplary computational processor hardware in accord with the present invention may include an arithmetic-logic unit (ALU) 10, or similar computational circuitry containing a hardware multiplier, for executing numerical operations, including modular exponentiation, upon provided data. The ALU 10 generally has access to a memory (RAM) 12 and various working registers 14. An operation sequencer 16 comprises logic circuitry for controlling the ALU, including data transfers to and from the memory 12 and registers 14, in accord with firmware or software instructions for the set of operations of a cryptographic algorithm. operation sequencer 16 may access operation parameters in the form of pointers stored in registers 18 that enable the operation sequencer 16 to locate an operand within the RAM 12, as well as other control information and the destination addresses of intermediate results. The hardware may also include a pseudo-random number generator (PRNG) circuit 20 that performs calculations and outputs a random numerical value. This random generator 20 may be accessed by the ALU 10, as directed by the operation sequencer in accord with the cryptographic algorithm and especially modular exponentiation steps thereof.

Figure 2:
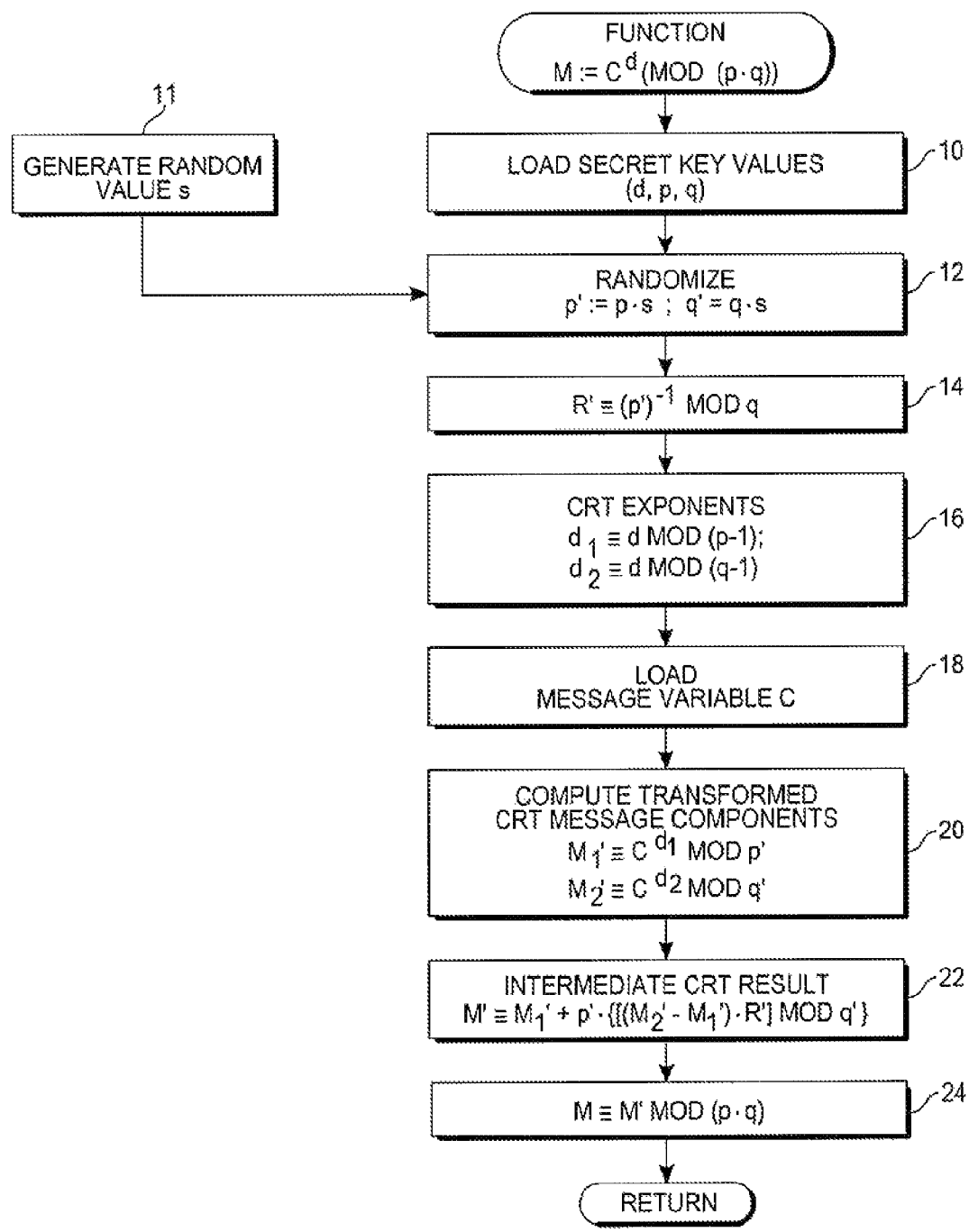
FIG. 2 is a flow diagram illustrating the general steps for modular exponentiation in accord with an exemplary embodiment of the present invention.

With reference to FIG. 2, an exemplary CRT-based modular exponentiation computation, M:=$C^d$ (mod (p·g)), by the aforesaid hardware and in accord with the present invention typically begins (step 10) by loading the private key values {d, p, q} into data storage accessible to the processing hardware, such as into the RAM 12 in FIG. 1. From there, the values can be transferred as needed into working registers 14 for use by the ALU 10. A random qenerator, such as the PRNG circuit 20 in FIG. 1, generates a random value for the transformation factor s (step 11) which is then used to randomize the private key modulus values p and q by means of multiplication transformations (step 12):

$$p':=p·s;$$

$$q':=q·s.$$

An inverse value R':=$(p')^{-1}$ mod q is calculated (step 14) by the processing hardware in a manner similar to calculations of inverse R:=$p^{-1}$ (mod q) known in prior versions of CRT-based modular exponentiation.

These transformed values p' and q' and the inverse R', will be used in later steps. Each decryption session using the private key values {d, p, q} will involve a different random value s, and hence different randomized values of the moduli p' and q' and of the inverse R', thereby securing cryptographic operations involving the modular exponentiation from cryptanalysis. (Note: The random value s must be co-prime with the original moduli p and q, so a standard divisibility test for co-primality should be a part of the random generation step 11 in order to weed out any unsuitable random values.) If desired, the size of the random value s may be selected to be within a specified range, so that the values p', q', $d_1$ and $d_2$ will be substantially the same size.

Alternatively, the transformation factor S could be a random choice from a finite set of preselected fixed values, instead of being randomly generated from scratch for each session. This can save substantial processing time, especially if p', q', and R' are also precomputed for each possible choice of s in the set. If for any reason, cryptographic security is deemed not to be an issue in a given circumstance, the choice of factor s, and hence of p', q', and R', could be a fixed value.

CRT exponents $d_1$ and $d_2$ are computed (step 14) from private key exponent d in the same manner as known in prior versions of CRT-based modular exponentiation, i.e.:

$$d_1:=d \,(mod\, (p-1));$$

$$d_2:=d \,(mod\, (q-1)).$$

If desired, this step could also be conveniently placed before the randomization of p and q, i. e. before step 12. Indeed, since the CRT exponents $d_1$ and $d_2$ are directly related only to the private key values d, p, and q, they can be pre-computed and loaded into the hardware data storage in place of private key exponent d, in step 10, eliminating step 16 from the session computations.

The variable C for the modular exponentiation is loaded (step 18) into data storage accessible by the processing hardware, e.g., into the RAM 12 of FIG. 1. From there it may be transferred as needed to working registers 14 for use by the ALU 10, usually as blocks of known size in accord with a cryptographic program. The variable C typically represents a ciphertext message to be decrypted; but could represent other cryptographic data, such as a digital signature. As with the computation of the CRT exponents $d_1$ and $d_2$, the particular place in the program sequence in which this step occurs can vary, as long as it is available by the time it is needed in step 20.

The CRT steps (steps 20 and 22) are applied, using the transformed moduli p' and q' and transformed inverse R', so as to obtain an intermediate message result M'. In particular, in step 20, CRT message components $M_1'$ and $M_2'$ are computed by the processing hardware in a manner similar to that known from prior CRT-based modular exponentiation operations, but using p' and q' as the moduli instead of the original private key modulus values p and q. That is, $$M_1':=C^{d_1} \,(mod\, p');\, and$$

$$M_2':=C^{d_2} \,(mod\, q').$$

Then the intermediate message result M' is computed (in step 22) by the processing hardware from the CRT message components $M_1'$ and $M_2'$ using the Chinese Remainder Theorem:

$$M':=M_1'+p'·\{[(M_2'-M_1')·R'] \,(mod\, q')\}.$$

Note that since p' and q' are randomized for each decryption session, the values $M_1'$, $M_2'$ and M' are likewise randomized in each session, thwarting cryptanalysis by known text attacks (e.g., repeated use by an attacker of a known value C) and other cryptanalysis techniques that may rely upon eavesdropping on hardware emitted parameters (EM emissions, time-dependent power consumption, etc.). The computations are different each time in a random way, yet are not much more computationally intensive than the straightforward application of CRT-based modular exponentiation.

The intermediate result M' has been obtained by applying an adapted CRT formula for $CRT(M_1', M_2')$. Other variant CRT formulae (such as the three examples given in the Background Art section) can be applied instead, if adapted with the appropriate transformations. To transform an initial CRT formula, the general rule is to always set $p':=p \cdot s$ and $q':=q \cdot s$. For all parts of the formula, like $R_1:=q^{-1}$ (mod p) and $R_2:=p^{-1}$ (mod q), we transform to $R_1':=(q')^{-1}$ (mod p) and $R_2':=(p')^{-1}$ (mod q). If p or q appears as a multiply factor in the formula, change it to p' or q', respectively. If p or q appears as a modulus, (mod p) or (mod q), we change it to (mod p') or (mod q'). For example, the CRT exponents, $d_1$ and $d_2$, are always $d_1:=d$ (mod (p-1)) and $d_2:=d$ (mod (q-1)). However, the CRT message components $M_1'$ and $M_2'$ are always transformed using p' and s' as moduli, per the invention, as described above. Thus, for the three exemplary variants, we obtain:

$$M'=CRT_2'(m_1', m_2'):=(m_1' \cdot R_1' \cdot q' + m_2' \cdot R_2' \cdot p')(\text{mod } p' \cdot q'),$$

$$M'=CRT_3'(m_1', m_2'):=\{[(m_1' \cdot R_1')(\text{mod } p')] \cdot q' + [(m_2' \cdot_2')(\text{mod } q')] \cdot p'\}(\text{mod } p' \cdot q'),$$

$$M'=CRT_4'(m_1', m_2'):=q' \cdot \{[(m_1' - m_2') \cdot R_4'](\text{mod } p')\} + m_2'.$$

Once the intermediate message result M' is obtained, it may be easily reduced to the final message M by a basic modular reduction operation (step 24):

$$M:=M'(\text{mod}(p \cdot q)):=M'(\text{mod } n).$$

This final reduction modulo $p \cdot q$ applies to all variants. Note that the product $p \cdot q$ has previously been computed as part of key generation, and is simply the public key modulus n available to all parties. Thus, it need not be recomputed if n has also been loaded into data storage available to the hardware processor, such as in association with previous step 10. Moreover, since use of the public key modulus n does not reveal anything about the private keys, the final reduction can be computed without random transformations and still be secure from cryptanalysis. The final message M is the same, even though p', q', M', etc. are random, since using a transformed modulus that is a random multiple s of the original modulus produces intermediate results that, while random, are still of the same congruence class as that found by using untransformed moduli.

What is claimed is:

1. A cryptographic method implemented in an electronic processing system for performing modular exponentiation computations, comprising:
    loading private key values, including at least one private key exponent and two private key moduli p and q, wherein the two private key moduli are p and q, into a data storage accessible to electronic processing hardware;
    selecting, by the electronic processing hardware, a non-random pre modular exponentiation transformation factor to secure cryptographic operations utilizing modular exponentiation from cryptanalysis, wherein the transformation factor is co-prime with the private key moduli;
    multiplying, by the electronic processing hardware, the private key moduli by the transformation factor to produce transformed moduli $p':=p \cdot s$ and $q':=q \cdot s$, wherein the transformed moduli are p' and q' and wherein the transformation factor is s;
    loading a first data value into the data storage at any time prior to performing modular exponentiation;
    computing, by the electronic processing hardware, at least one transformed inverse value, $R':=(p')^{-1}(\text{mod } q)$;
    performing, by the electronic processing hardware, a modular exponentiation upon the first data value using the at least one private key exponent and the transformed moduli to obtain an intermediate data value; and
    reducing, by the electronic processing hardware, the intermediate data value modulo a product of the two private key moduli to obtain a final data value.

2. The method as in claim 1 wherein the selected transformation factor is a fixed value.

3. The method as in claim 1, wherein performing modular exponentiation is executed using a Chinese Remainder Theorem (CRT) calculation of the intermediate data value.

4. The method as in claim 3, wherein a pair of CRT exponents are computed from a single private key exponent as part of the performing the modular exponentiation.

5. The method as in claim 3, wherein a pair of CRT exponents are pre-computed from a single private key exponent, the pair of CRT exponents being loaded as private key exponents into the data storage.

6. The method as in claim 1, wherein the product of the two private key moduli is pre-computed as a public key modulus, the public key modulus also being loaded into the data storage for subsequent use in the reducing of the intermediate data value.

7. The method as in claim 1, wherein the first data value represents a ciphertext message, the modular exponentiation is executed in the electronic processing hardware as part of a cipher program, and the final data value represents a decrypted plaintext message.

8. A cryptographic method implemented in an electronic processing system for performing modular exponentiation computations, comprising:
    loading at least one private key exponent d and two private key moduli p and q, wherein the two private key moduli are p and q, into a data storage accessible to electronic processing hardware;
    selecting, by the electronic processing hardware, a non-random pre modular exponentiation transformation factor s to secure cryptographic operations utilizing modular exponentiation from cryptanalysis, wherein the transformation factor is co-prime with the private key moduli;
    multiplying, by the electronic processing hardware, the private key moduli by the transformation factor to produce transformed moduli $p':=p \cdot s$ and $q':=q \cdot s$, wherein the transformed moduli are p' and q';
    computing, by the electronic processing hardware, at least one transformed inverse value, $R':=(p')^{-1}(\text{mod } q)$;
    loading a first data value C into the data storage at any time prior to performing modular exponentiation;
    performing a modular exponentiation upon the first data value C using the at least one private key exponent d and the transformed moduli p' and q' to obtain an intermediate data value M', wherein performing modular exponentiation is executed by the electronic processing hardware using a Chinese Remainder Theorem (CRT) calculation of the intermediate data value involving:
    (a) computing CRT exponents $d_1 := d$ (mod (p−1)) and $d_2 := d$ (mod (q−1)),
    (b) computing CRT message components $M_1':=C^{d_1}$ (mod p') and $M_2':=C^{d_2}$ (mod q'), and
    (c) computing an intermediate data value M' from the CRT message components $M_1$ and $M_2'$; and reducing, by the electronic processing hardware, the intermediate data value M' modulo a product of the two private key moduli, $n = p \cdot q$, to obtain a final data value $M := M' \pmod{n}$.

9. The method as in claim 8, wherein the CRT exponents are pre-computed from the private key exponent d and loaded as a pair of private key exponents $d_1$ and $d_2$ into the data storage.

10. The method as in claim 8, wherein $M' := M_1' + p' \cdot \{[(M_2' - M_1') \cdot R'] \pmod{q'}\}$.

11. The method as in claim 8, wherein $M' := (M_1' \cdot R_1' \cdot q' + M_2' \cdot R_2' \cdot p') \pmod{p' \cdot q'}$, and $R_1' := (q')^{-1} \pmod{p}$.

12. The method as in claim 8, wherein $M' := \{[(M_1' \cdot R_1') \pmod{p'}] \cdot q' + [(M_2' \cdot R') \pmod{q'}] \cdot p'\} \pmod{p' \cdot q'}$, and $R_1' := (q')^{-1} \pmod{p}$.

13. The method as in claim 8, wherein $M' := q' \cdot \{[(M_1' - M_2') \cdot R'] \pmod{p'}\} + M_2'$.

14. The method as in claim 8, wherein the product $n = p \cdot q$ is pre-computed and loaded into the data storage for subsequent use during the reducing of the intermediate data value.

15. The method as in claim 8, wherein the first data value represents a ciphertext message, the modular exponentiation is executed in the electronic processing hardware as part of a cipher program, and the final data value represents a decrypted plaintext message.

* * * * *